Nov. 10, 1970 J. M. DEAN 3,539,815
SEALED DETECTOR WITH LIGHT IMPERVIOUS HOUSING
Filed May 1, 1968 2 Sheets-Sheet 1

INVENTOR.
JAMES M. DEAN
BY Hill, Sherman, Meroni, Gross & Simpson
ATTORNEYS

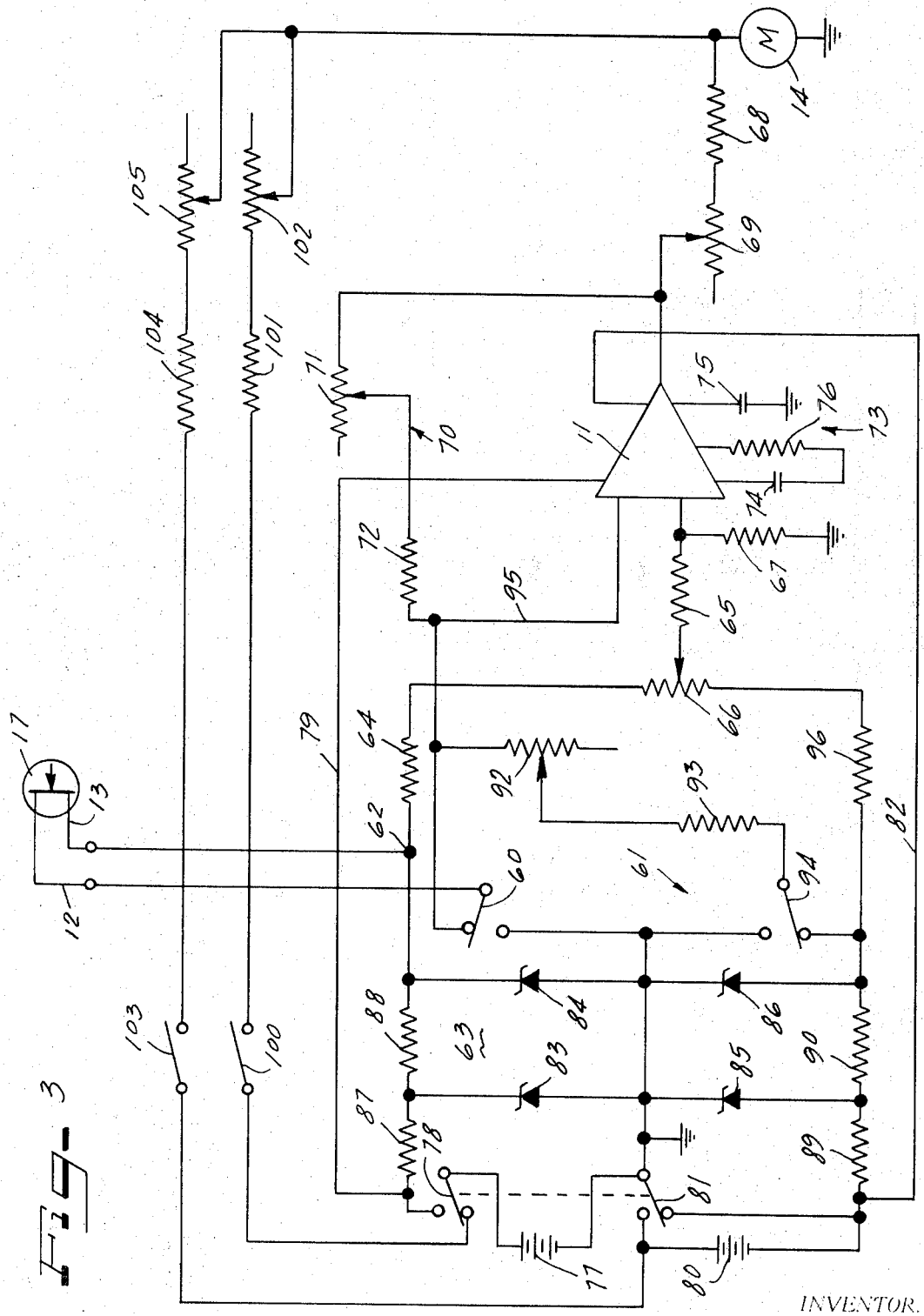

United States Patent Office 3,539,815
Patented Nov. 10, 1970

3,539,815
SEALED DETECTOR WITH LIGHT IMPERVIOUS HOUSING
James M. Dean, Des Plaines, Ill., assignor, by direct and mesne assignments, to Charles P. De Vito, Albert P. De Vito, Ralph R. Erlich, and Michael N. Fine, as trustees
Filed May 1, 1968, Ser. No. 725,755
Int. Cl. H01j 39/12
U.S. Cl. 250—211                 6 Claims

ABSTRACT OF THE DISCLOSURE

A light sensing device which includes a small probe adapted to be positioned in a vicinity where light intensity is to be measured. The device includes a light sensing element which is formed by a field effect semiconductor secured to the interior surface of a housing and having leads extending therefrom for connection to the input of an amplifier. The field effect semiconductor is connected to an amplifier and read-out device and detects energy in the visible spectrum. The light sensing element is entirely encapsulated within a light impervious housing but detects light or other energy impinging on the outside of the housing.

BACKGROUND OF THE INVENTION

Field of the invention

This invention relates generally to light sensing devices, and more particularly to a light sensing device which uses a field effect semiconductor as the light sensing element.

Description of the prior art

Heretofore, light sensing devices have been employed to sense variations in light intensity. These light sensing devices require that photons impinge upon the light active surface of the device to produce either a voltage across the device or change the impedance of the device. Furthermore, very sensitive light responsive devices usually employ photon multipliers to increase the output of the device. Such photon multiplier devices are relatively expensive and large.

SUMMARY OF THE INVENTION

Accordingly, an object of the present invention is to provide a light sensing device which gives an accurate indication of the light intensity directed toward the device.

Another object of the present invention is to provide a light sensing device utilizing as the light sensing transducer a field effect semiconductor element which is secured to the interior of a relatively small housing.

Yet another object of the present invention is to provide a light sensing device which utilizes a field effect semiconductor element and which can be connected to a conventional amplifier circuit or other conventional circuitry to operate a read-out device such as a meter.

Another object of the present invention is to provide a light sensing device wherein the device is formed as a light probe of relatively small dimensions.

A still further object of the present invention is to provide a light sensing device which is relatively inexpensive to manufacture and which is highly efficient in operation.

Briefly, the novel concept of this invention is in using a field effect semiconductor element as a light sensing probe. The field effect semiconductor element is encapsulated in a metal container or housing and secured to the interior surface thereof. The field effect semiconductor element includes an N type channel with a P gate. The drain and source of the N channel have terminal leads connected thereto for connection to an amplifier, and the P type gate is secured to the interior surface of the housing. The housing is substantially cup-shaped having an open end which is sealed by a plastic plug. The plastic plug has apertures therein for passage of the terminal leads connected to the field effect semiconductor.

Accordingly, other objects, features and advantages will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 3 is a detailed schematic diagram showing the preferred electrical arrangement of a light sensing device according to the present invention.

DESCRIPTION OF THE PREFERRED EMBODIMENT

Figure 1:
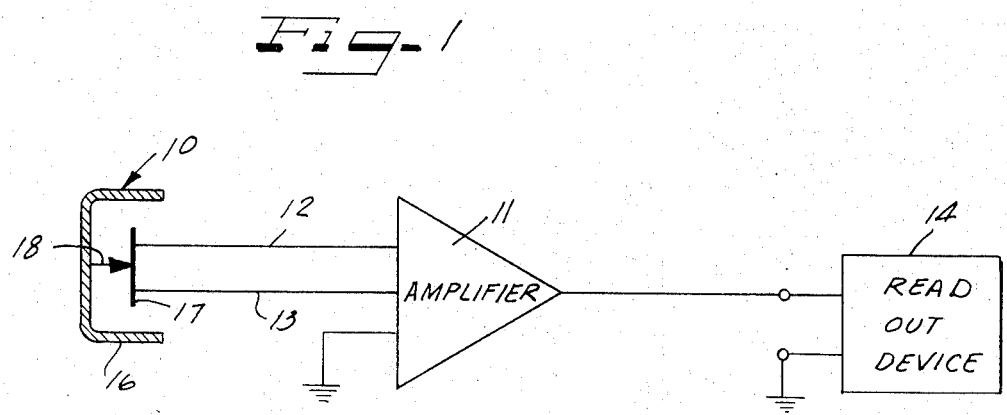
FIG. 1 is a simplified schematic diagram of a light sensing device constructed in accordance with the principles of this invention.

FIG. 1 illustrates a light sensing device constructed in accordance with the principles of this invention. The light sensing device includes a light sensing probe 10 connected to the input of an amplifier 11 via a pair of terminal leads 12 and 13. Photons of light impinging on the probe 10 will produce a control voltage at the input of the amplifier 11 and this control voltage is then amplified and applied to a read-out device 14. The read-out device 14 may be of any conventional design and, as in many situations, may be a conventional meter movement.

The light sensing probe 10 includes a metal housing 16 which may be constructed of copper and may be gold plated if desired. A field effect semiconductor element 17 is positioned within the housing 16 in such a manner that a gate electrode of the field effect element 17 is connected to the interior surface of the housing 16.

Figure 2:
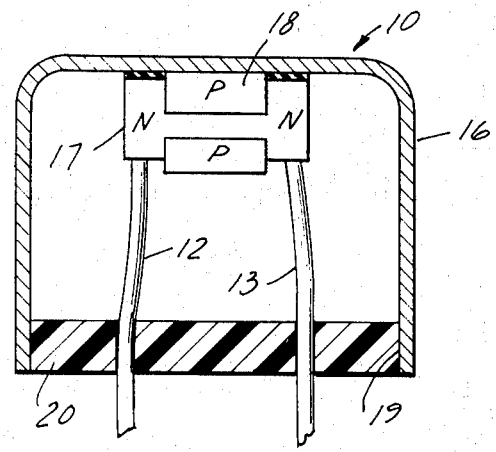
FIG. 2 is an enlarged sectional view of a light sensing probe constructed according to this invention.

As best seen in FIG. 2, the field effect semiconductor element 17 includes a channel conductor of N type material and a gate of P type semiconductor material. The gate 18 is in contact with the interior surface of the housing 16 opposite an opening 19 which is formed in the housing 16. Although the housing 16 is shown as cup-shaped, it will be understood that the housing may take any form or configuration. The N type channel comprises the source and drain junction of the field effect device and are connected to the lead terminals 12 and 13. The lead terminals 12 and 13 extend through an end plate 20 which may be constructed of plastic or other non-metallic material. The end plate 20 is apertured to receive the terminal leads 12 and 13 therethrough.

A unique and novel feature of the present invention is the fact that the light sensing element, the field effect semiconductor 17, is entirely encapsulated within a housing and apparently sealed from photons of energy. However, it has been discovered that photons of energy appear to pass through the housing 16 or the end plate 20 to affect the operation of the field effect semiconductor 17. Laboratory experiments have indicated that the light sensing probe 10 is responsive to slight variations in light impinging on the probe when the probe is positioned within a well lit room. For example, the light intensity of a flashlight directed toward the probe from approximately 20 feet will produce an indication at the read-out device 14 even when the room is already well illuminated from conventional lamps or outside lights.

The size of the probe 16 is relatively small, having a diameter of less than ¼ of an inch, and the field effect semiconductor 17 may have a dimension of approximately .020 of an inch across the ends thereof. Furthermore, it will be noted that the field effect semiconductor may have a P type channel and an N type gate electrode. Furthermore, it will be understood that the field effect semiconductor element 17 may be secured to a mounting plate positioned within the interior of the housing 16 rather than secured directly to the interior surface of the housing 16.

FIG. 3 illustrates the detailed circuit arrangement of the electronic circuitry used in the light sensing device of the present invention. The field effect semiconductor element 17 has the drain electrode thereof connected to a movable contactor 60 of a ganged-together switch 61. The source junction of the field effect semiconductor 17 is connected to a circuit point 62 which, in turn, forms an output junction of a voltage regulator network 63. As mentioned hereinabove, the gate electrode of the field effect semiconductor is not connected to the circuit and is floating.

The circuit point 62 is connected to the input terminal of the amplifier 11 via a pair of resistors 64 and 65 and a potentiometer 66. A voltage developing resistor 67 is connected between the input terminal of amplifier 11 and ground potential. The output of the amplifier 11 is connected to the meter 14 via a resistor 68 and a potentiometer 69. Also connected at the output terminal of amplifier 11 is a feedback network 70 which may include a variable resistance element 71 and a fixed resistor 72. However, the potentiometer 71 of the feedback network 70 may be eliminated and only a single fixed resistor used in the feedback network.

A compensating network 73 is connected to the operational amplifier 11 and comprises a pair of capacitors 74 and 75 and a resistor 76. A positive voltage source 77 is connected to one of the input terminals of the operational amplifier 11 via a switch 78 and a line 79. Similarly, a negative voltage source 80 is connected to a negative input terminal of the operational amplifier 11 via a switch 81 and a line 82. It willl be noted that switches 78 and 81 are preferably ganged together for operation from a single lever or toggle.

The battery of power supplies 77 and 80 are Zener voltage regulated by a plurality of Zener diodes 83, 84, 85 and 86 and a plurality of resistors 87, 88, 89 and 90, connected in circuit arrangement as shown in FIG. 3.

The drain electrode, lead terminal 12, is connected to the negative voltage source 80 through the switch contact 60, a potentiometer 92, a resistor 93 and a switch contact 94. Switch contactors 60 and 94 are ganged together for operation from a single lever. The terminal lead 12, of field effect semiconductor element 17, and the negative voltage source 80, are connected to one of the input terminals of the operational amplifier 11 via a lead 95. Furthermore, it will be noted that the potentiometer 66 connected at one end thereof to the fixed resistor 64 has the other end thereof connected to a fixed resistor 96 for connection to the negative voltage source 80.

In the circuit arrangement shown in FIG. 3, the read-out meter 14 is also used to test the condition of the batteries 77 and 80. The positive terminal of battery 77 is connected to the meter 14 through a switch 100, a resistor 101 and a potentiometer 102. Closing switch 100 completes the current path for the battery 77 through the meter 14. The positive terminal of battery 80 is connected to the meter 14 through a switch 103, a fixed resistor 104 and a potentiometer 105.

It will be noted that the DC of batteries 77 and 78 may be replaced by an AC to DC power supply. Therefore, the light sensing device, when using batteries, may be fully portable, or when connected to an AC power source may be confined to a particular area.

The size of the light sensing probe 10 is very small and therefore lends itself readily to many uses, some of which are enumerated below as examples. Some of the uses are flame sensing systems, optical encoder conveyor belt controls, saw mills controls, automotive controls, lever controls, formula mixing devices, photoelectric tape readers, street lighting controls, quality control system on high speed production lines, tracking devices, and numerous other uses.

Accordingly, depending on the use, it will be understood that variations and modifications may be effected without departing from the spirit and scope of the novel concepts of this invention.

I claim as my invention:

1. A light sensing device including an amplifier having input and output terminals, a read-out device connected to the output terminals of said amplifier, the improvement therein comprising a field effect semiconductor element having a pair of electrodes connected to the input terminals of said amplifier, said field effect semiconductor element producing an output signal corresponding to light intensity directed toward said field effect semiconductor element, whereby said output signal produces a corresponding indication at said read-out device, a light impervious metal housing in the form of a shell in which said field effect semiconductor element is mounted and which substantially seals it from photons of energy, said field effect semiconductor element having a third electrode electrically attached to said metal housing and secured to the interior surface of said shell, and a pair of electrical leads connected to said pair of electrodes of said field effect semiconductor element and extending from said metal housing for connection to the input terminals of said amplifier.

2. A light sensing device according to claim 1 wherein said housing is copper.

3. A light sensing device according to claim 2 wherein said copper housing is gold plated.

4. A light sensing device according to claim 1 wherein said metal housing is a cup-shaped shell having an open end, a cover member formed with openings attached to the open end of said shell, and said leads passing through the openings formed in said cover.

5. A light sensing device according to claim 4 wherein said third electrode of said field effect semiconductor element is attached to the interior surface of said shell opposite said open end.

6. A light sensing device according to claim 4 wherein said field effect semiconductor pair of electrodes comprise source and drain terminals, a source of power connected to said source and drain terminals and said source and drain terminals connected to the input terminals of said amplifier, and said third electrode comprises a gate terminal.

References Cited

UNITED STATES PATENTS

| | | | |
|---|---|---|---|
| 2,013,095 | 9/1935 | Friend. | |
| 2,993,998 | 7/1961 | Lehovec | 250—211 |
| 3,062,092 | 11/1962 | Schmidt | 250—211 X |
| 3,271,638 | 9/1966 | Murad | 317—235 X |
| 3,283,157 | 11/1966 | Blackmer | 250—239 X |
| 3,289,002 | 11/1966 | Goodman | 250—239 X |
| 3,294,988 | 12/1966 | Packard | 317—235 X |
| 3,296,462 | 1/1967 | Reddi. | |
| 3,366,802 | 1/1968 | Hilbiber | 307—311 X |

ARCHIE R. BORCHELT, Primary Examiner

T. N. GRIGSBY, Assistant Examiner

U.S. Cl. X.R.

317—235; 356—218